(12) United States Patent
Olsson

(10) Patent No.: US 6,445,415 B1
(45) Date of Patent: Sep. 3, 2002

(54) INCREASED DEPTH OF FIELD FOR PHOTOGRAPHY

(76) Inventor: Kjell Olsson, Sananigsvagen 17 S-175 45, Jarfalla (SE)

( * ) Notice: Subject to any disclaimer, the term of this patent is extended or adjusted under 35 U.S.C. 154(b) by 0 days.

(21) Appl. No.: 09/091,866

(22) PCT Filed: Jan. 9, 1997

(86) PCT No.: PCT/SE97/00017

§ 371 (c)(1),
(2), (4) Date: Jun. 25, 1998

(87) PCT Pub. No.: WO97/25690

PCT Pub. Date: Jul. 17, 1997

(30) Foreign Application Priority Data

Jan. 9, 1996 (SE) .............................................. 9600083

(51) Int. Cl.$^7$ .............................................. H04N 5/232
(52) U.S. Cl. ...................................................... 348/345
(58) Field of Search ................................ 348/218, 345, 348/349, 350, 351, 353, 354; 382/255, 254, 256; H04N 5/232

(56) References Cited

U.S. PATENT DOCUMENTS

| 4,661,986 A | | 4/1987 | Adelson | |
|---|---|---|---|---|
| 4,804,931 A | * | 2/1989 | Baba et al. | ............... 250/201.2 |
| 5,148,502 A | | 9/1992 | Tsujiuchi et al. | |
| 5,282,045 A | | 1/1994 | Mimura et al. | |
| 5,629,735 A | * | 5/1997 | Kaneda et al. | ............... 348/350 |

FOREIGN PATENT DOCUMENTS

WO  9410653  5/1994

* cited by examiner

Primary Examiner—Tuan Ho
(74) Attorney, Agent, or Firm—Connolly Bove Lodge & Hutz LLP

(57) ABSTRACT

The invention comprises a method and system for achieving increased depth of focus at photography. The method creates an improvement of depth of field at use of traditional "Tilt and Shift" - technique, and increased possibilities to obtain good depth of field with other and quite ordinary cameras. The method is primarily meant for electronic cameras, where the image is created electronically from a sensor in the camera and is based on a multi photo technique. Several photos are shot with different focused parts of the scene subjects in respective photo, and a basic image is integrated by contributions from the different images. Calculated image transfers based on lens- or sensor settings for respective image, compose a starting point for corrections of images and selection of respective image contributions.

18 Claims, No Drawings

INCREASED DEPTH OF FIELD FOR PHOTOGRAPHY

BACKGROUND OF THE INVENTION

1. Field of the Invention

The invention comprises a method to increase the depth of focus (or field) for photography, and means for the method. The method constitutes an improvement of the depth of focus in use of traditional T / S —technology, "Tilt and Shift", and an increased possibility for improved depth of field with other cameras. The method is mainly aimed for digital cameras, where the image is created from a sensor in the camera, instead of on a photographic film. By use of present scanning technology however, it is easy to transfer a film photo to an electronic image. The method can be used also for those cases. In the following the method is mainly presented for the cases, when the picture is created electronically directly in the camera.

2. Description of the Related Art

In T / S cameras one or both of the lens and the "image plane" are movable. The image plane is that plane, where the film or the sensor is positioned. A plane in the scene is sharply focused in a "focused plane", which might be localized in front of, back of or cutting the image plane. Proportional to the distance between the image plane and the focused plane, the blurring grows larger in the image. In T / S cameras the photographer often views the image on a focusing screen positioned in the image plane. He controls the camera settings for a focused image on the focusing screen. Then he places the film or sensor in this position and shoots.

Photographers use many different ways of working. The profession is often creative, sometimes artistic. In practice the photographer puts the camera in position directed to the subject, arranges the image plane in the desired perspective, usually vertical, as we are used to view the world from a vertical perspective. Tilting an ordinary camera upwards, e g for placing a church tower inside the seeker, the camera will produce an image of the tower with a tilting perspective, showing a tower tilting or falling in. Parallel vertical lines are no more parallel in the image.

Then the photographer focuses and positions the subject for the image. Here difficulties might arise, which the invention can solve. The focal aperture is not only used for control of the light strength, but also for increasing the depth of field, e g at product photography. Increased exposure can compensate smaller apertures. However long time of exposure implies risks for mechanical disturbances blurring the sharpness.

T / S cameras are used for product photography, and when there is a desire to increase the depth of field from what an ordinary camera can offer. A close picture on a product with large extension in distance, might be given focus both on the front and back parts, by tilting the focal plane, cutting the front as well as the back part of the product image. The tilting might be arranged in two ways. One by positioning the film or sensor in the tilting image plane. The other by tilting the lens instead, turning the focal plane into the desired angle. Usually a vertical image plane is desired, obtaining a vertical perspective, and then there is just the method of tilting the lens, until the focal plane is positioned vertically in the desired image plane.

As subjects generally are not extended just in a plane of two dimensions, but are three-dimensional bodies with varying extensions, also focal aperture reductions are used to decrease the angle of refraction from the lens. Thus the image plane can be farther from the real focus, without too large blurring errors. However the subject or the light conditions might reduce the possibilities.

Examples on Prior Art

In the field of television the image experienced by the human beings has always been created by the use of many "subimages" integrated together. By showing several frames (50 to 60) per second, the subimages are integrated in time, in order to show smooth movements, increase the resolution and the signal to noise ratio. A study of only one subimage reveals a poor image quality. An ordinary still camera, in contrast gives a single shot image of excellent quality, including much higher resolution and very low noise content.

In the field of research for high definition television, there has been an increased awareness of second order effects of the increase of image resolution. The one that will be discussed here is the aspect of depth of focus.

For a television image with low resolution, there is a large span of subject distances that can be "focused" to a single image plane, because the blurring of the optics is anyhow less than the resolution of the sensor detectors. However increasing the sensor pixel resolution e. g. with a factor 4 means a decrease of the depth of focus with a factor 2.

For television it is an obvious method to increase the depth of focus, by using the natural stream of new video images integrating those together, while changing the focus setting.

There are several similar patents in the field of television using this method of increasing the depth of focus. Most of those patents use transfer of the ordinary X,Y -based image to a space frequency based image description. They are using power comparisons in the space frequency or frequency filtered band pass domain, between subimages to define which subimage is in focus. They are differing in the method details of performing this object.

One method according to Mimura et. al. (U.S. pat. No. 5, 282,045) uses changing of the focus distance between frames, and then utilizing the integration of subimages in the mind of human viewers. The result is said to increase the experienced depth of focus in the mind of humans.

The method also includes a "contour corrector", which function is not described, but is implicitly an ordinary artificial "contour sharpener", said to add higher frequencies to the contour, which after integration in the mind of humans, is experienced as a higher resolution image.

There are many different problems involved in those television applications, e g.

There are time restrictions. Only a short time is available for calculations and mechanical focusing, due to the high image frequency.

By the selection process of focused frames, the number of integrations decreases and the noise increases, decreasing the image quality.

In television there are generally movements, by subjects in the scene, or the camera panning or zooming the scene. In fact the movements are inherent in the television approach, and necessary for the human expectations on the television media. Then there are small possibilities for methods utilizing exact matching of successive subimages with different focus, as the subimages contains other changes due to movements. In the patent of Mimura et al, the depth of focus function is simply put off, when there are movements.

On the other hand the television is in many ways "forgiving" image deficiencies. A poor image is immediately followed by new ones in the continuous video-stream of images. The short time involved means that many imperfections pass the viewer unnoticed. Then a process of selecting focused image parts and combining those together can be allowed to involve some inaccuracies and non-perfect matches, without disturbing the viewer's total integrated experience of the television video-image quality. This is opposite to the application of a still camera. The still photo is viewed for much longer time periods, and all imperfections and small details are also time integrated to noticeable and disturbing image quality problems. In the professional business, e. g. in case of a new company product photo, there is no forgiveness to be expected for even small image quality deficiencies.

BRIEF SUMMARY OF THE INVENTION

Invention Functions

The present invention concerns a method to achieve sharpness and depth of field for a still photo by use of multi-shots, where different camera settings can be used including aperture reduction technique. The method utilizes possibilities for digital image transfer after the shot, and the involved processes might be performed using automatic methods to various extents. An operator might also interact on computer screens, manually improve and control the result of the processes.

The Method Comprises

The camera sensor is turned into a suitable focal plane and the photo is shot.

Then the perspective can be turned into a desired position by image transformation. One way to do this is sensing the sensor turning in relation to the desired perspective and feed data to a calculation unit, which calculates how much the image should be turned and makes the transformations. E. g. if the image is tilted an angle u related to the desired vertical plane, then the image plane can be turned around its front edge by u.

Then image points at the distance a from the axis would be scaled to the distance a*cos(u) from the axis. Those points are also moved closer to the lens, a distance a*sin(u), which means the same reduction of scale as moving the image the corresponding distance closer to the lens, i. e. a distance b to the lens related to (a*sin(u)+b). This is easily illustrated by drawing radiation lines through the optical center to respective image point. Thus turning the image around the axis, the points on the image will be projected through simple geometrical rules to the new image plane.

The choice of turning axis can be transferred as turning around another axis plus a transversal movement. Transversal movements of image elements, changing the distance from the lens, result in a proportional change of scale of the image element. Thus ordinary focusing gives rise to size changes. Knowledge about the relative image distance from the lens (the optical center) would be used for the size scale.

When there are defocused image parts, also the defocused area will be enlarged proportional to a general image enlargement. A defocused edge would be wider, if special actions are not performed. Such actions are included in the invention and will be presented further in the section about enlargement.

Projections of images might be performed as second steps, in turning to the right image perspective. The operator might fine tune or control the total process, by introducing the desired axis and turning. He can also define a certain speed of turn and study the image turning until it reaches the desired position, when he can stop the turning or interactively change the turn directions, fine tuning the right position.

The calculations can be performed using a basic image, which has been mapped to an increased number of image pixels. Then unnecessary losses of resolution can be avoided through the calculations and image processing.

The control setting of desired focus planes at photography can be simplified and automated by the photographer setting the focus successively on those points, through which he wants the plane of focus. With known coordinates and focus settings the focus plane can be calculated and any turning of lens or sensor also. Simple calculation programs, including the camera optics, can be stored in the pocket calculator, which can present the result as scale partitions for a turning control. With a PC or other computers the operator can work with the image on the computer screen. Programs in the computer can control automatic focus measurements and calculation of focal plane and finally control turning and movements of the lens (sensor) to the right position. Thus the process can be performed as a production process, which is often wanted.

Creation of depth of field by use of several "stills".

At product photography the scene is often static, i. e. several photos can be shot reproducible. A product with relatively large extension in distance, can be photographed from the same position with focus set for different parts for the different photos. On the different photos, different parts are respective focused and defocused. They are also of different size.

Simple addition of image elements.

A sharp image of the product can be created by adding together focused different image elements from respective image. The process is made possible by first changing the image scale to the same size, according to sections above. In many situations the operator might do the element selection on a computer screen and determine from which image respective element shall be transferred to the final image.

The process can also be automatic according to the invented methods. The focus for an image sub-area is compared between images and the respective focused image element is selected. The division borders between neighboring image elements are chosen, e g where the defocusing is about the same from the different images. Any small deficiencies in the division interfaces might e g be handled by averaging that area between the respective images. Simple product shapes such as a cereal box, might be photographed from a perspective, which gives a corner the shortest distance to the camera and other parts successively farther distant. A series of photos with successively changed focus can produce the said focused image elements for image element additions.

The cereal box photographed inclined from a high front position, shows three surfaces; a long, a short and an upper side. By tilting the sensor or lens, a focused plane might be positioned along each of the three apparent surfaces. The three images are transformed by calculations to the selected basic image. If the sensor is turned, then the transformation also includes perspective returning.

After the calculations the product image can be combined from the three sharp image elements. In practice small deviations might have arisen in positions and sizes between the three different photos. Disturbances might have shaken the positions and controls. So sharp borders and edges are identified for the different images and common corners and boundaries are matched together, through fine tuned corrections of position and scale for the different images.

The basic image might e. g. be an image with the right perspective e. g. a vertical sensor and a lens setting giving a focus plane for a product's front, or some other important part of the product. This basic "image" can be defined by sensor and lens settings and be the defined "basic image" without even being photographed, also if a photo would have simplified the matching of the different photos to the basic image.

When additional pictures are desired for the integration of a sharp cereal box, then an extra focal plane might be positioned along the outmost left and right edges and through the diagonal of the upper surface, for helping adjustments of the said surfaces. When the table surface is of interest, on which the box is standing, then a focal plane might be positioned along this surface for an additional photo.

The integration of the final image might in this example be relatively simple, as each sharp element is easily identified and the defocused areas are substituted by sharp areas from other images.

Recalculations of perspective and scale of size is done to the defined basic image format, with the help of known settings for the sensor and lens. Analyses afterwards without knowledge of the settings, to find out the image position relative to another image position, can be performed, but it might need some more processing.

Corrections at the integration of respective sharp image elements are performed using common image parts e. g. edges and corners. Often there are image and text details, which simplify the match. If the adjustments of an image wouldn't be good enough, e. g. dependent on a difficult perspective change, then local adjustments can be done for the different image elements. The sharp details are positioned in agreement with information from other images, and where distances in between are needed to be increased or decreased in a noncoherent way, the local area selected therefore is preferable an area with slow light and color variations.

Complex products.

Products might be more or less complicated in structure. There might be arms, poles, holes etc. Those can be identified by operators as special areas, "mountains and valleys", where a small area might contain large distance variations, and whereby several photos might be needed to cover the dynamics. Areas with mountains and valleys can also be identified automatically according to the invention. They are areas, which are characterized in causing strong defocusing in consecutive images, although the neighboring image has sharp elements and though the transversal distance is close between the sharp parts of respective image. The operator can be alarmed about such and other problem areas by blinking on the screen, possibly at the position and with side comments. Often the operator might find focal planes, which can be positioned along steep mountains. And with additional photos, better integrated sharpness can be obtained for such areas.

If the product has an arm or a pole, then one or more images might be shot with focal planes through the arm, such that this subject is shown as a sharp object. In a corresponding way as for the cereal box, those images are transformed to a basic image for integration with the other images on the product.

Detailed Description of the Invention

The process for image element identification might start at any photo, but it might be an advantage to start with the front or back. In this presentation the start is the front photo, and its center element.

An image area is selected. The area is surveyed considering borders, i. e. borderlines and edges with fast variations of light strength or color. The color resolution might be worse, however. The selection method might be the derivative, relative derivative ($1/p*dp/dq$; $q=x,y$;), difference in light or color strength, the relative difference of strength, etc. Those borders are compared with corresponding values for the photos below, and they are defined as belonging to the front photo, when the borders have not better focus in photo number 2. The space in between the borders includes surfaces, and surfaces limited by borders belonging to photo 1 are also preliminarily assigned to this photo until further steps. A new adjoining image area is selected and the process is repeated, until the whole image has been worked through for the given series of photos, image 1 to n.

There are alternative search processes preferable in certain cases, e. g. when there are many image elements from different images in the selected search area. Then it might be better directly analyzing edges of the present photos, and by comparisons identify the respective belongings of the different edges. When the following areas been worked through, the final image can be integrated successively. Borders are selected and processed according to examples. When a border is an edge between two areas on different focused distances, the edge might be assigned to the first area, and the transition position between images might be selected at the edge on the second image.

Aspects on Focus and Sharpness

Sharpness when changing the scale of size, enlargements.

At enlargements all the image elements are enlarged. Those elements with significant distance extensions are enlarged including their defocused parts, which then might be more apparent. Defocused borders, e. g. the border between a red subject and a green background, are imaged giving a border width containing various red-green mixtures. For the same defocusing degree, the real edge position obtains 50% contributions from each side. A defocused point obtains a blurring defocused circle with smeared contributions from the point. Tips, corners and irregular shapes are imaged blurred, round smoothed and loosing their detail positions. Geometrical objects can be reshaped, by reconstruction of the edges to the corner tips etc.

When the lack of sharpness is depending on the focusing distances, as in the described examples, the focused state is determined by simple optical rules, and according to the invention the focused image can be estimated and often also the defocused image borders can be corrected.

Digital photography is based on sensors, usually with smaller dimensions than the final photo image. The image processing includes enlargements and then an interest is not loosing sharpness. Especially at product photography the subject consists of human designed structures, i. e. identifiable geometrical forms. Then there are preconditions to do corrections of defocused well-known detail structures in many cases.

There is also a natural interest in good-looking product pictures, which emphasizes the importance of sharpness. Close up pictures on products enlarge the depth of focus problems, and then also the need of methods to improve the image quality.

Depth of field is relatively short at close ups. By reduction of the lens focal distance, the subject image decreases approximately proportional, but the relative depth of field might be increased. Subsequent magnifications increase the blurring too. Photography at distances, using zoom, might give the product a flat impression, which might be negatively experienced. With a small sensor and the product object filling the image, there is a need for a lens with a small focal distance, giving an angle of view, when looking at the photo, that gives associations to the right appearance of the product. Considering that aspect, small products should be shot at short distances with short focal distances.

The invention includes methods, based on knowledge about optical rules, for correction of defocusing, and it is based on knowledge about geometry for estimating structures and improving the sharpness.

Correction of sharpness using optic methods.

Above, some methods have been presented, by which the image sharpness can be improved e. g. at product photography. Below there is a summary:

a. Integration of several images on a product, being shot with different camera settings, including focus. Perspective turning and scale sizing can be used to match the different images to get a sharper image.
b. Adding information by use of photo with extra small focal aperture. By that the light will be extra reduced and the depth of field increased. Then object details with high light and contrast are imaged with larger depth of field. Such images can be used to match different images with less depth of field e g in the method in point (a) above.
c. Adding information from photos being shot with less focal distances. Changing the scale is simplified when the position is maintained of the subject relative the center of the lens. Depth of field might be improved also in those cases. On the other hand, the image object is smaller and is not utilizing the resolution at maximum. Also this type of photos can be used in the matching of images.
d. By tilting the lens or sensor, a corresponding tilting focal plane is positioned through the product. The image perspective is changed if the sensor is tilted, whereby a subsequent perspective turning is performed. This type of images can be used to give information about sharpness of elements, which might be missing in point (a).
e. Consecutive photos can be used for optical calculations of the focused image distance of an image element and the real dimensions in this focused position. This method can be used e. g. for image elements that are out of focus on both neighboring images.
f. By measuring the defocusing of edges and borders, the focused position of those image elements can be calculated and the border blurring be corrected.
g. Geometric figures can be inter- and extrapolated from consecutive photos and thereby sharpness can be estimated for defocused distances. The method might be simplified by storing a library of a number of usual geometric figures, and used in comparisons with the image information. Various methods, e. g. best correlation might be used.

Some optical relations regarding depth of field.
Usual optical notations and definitions:

a, b, f are distances to the lens from the subject, image, focus point.

H, h are the dimensions (e. g. the height) of the subject, its image.

$r_o$, $r_i$ are the radius of the focal aperture, the radius of the defocused circle related to a sharp point.

A subject on the distance a+da is focused on the distance b−db.

Simple optical rules give:

$$1/a+1/b=1/f; \qquad (1)$$

$$1/b=(a-f)/\ a^*f; \qquad (2)$$

In the same way:

$$1/\ b(1-db\ /\ b)=1/f-1\ /\ (a+da); \qquad (3)$$

(2) in (3) gives:

$$db\ /\ b=da^*f\ /\ a^2 \ast 1/\ (1-\ f/a+da/a) \qquad (4)$$

and $$db/b \approx da^*f\ /\ a^2; \qquad (5)$$

Proportionality gives:

$$r_1=r_0 \ast db/b; \qquad (6)$$

(5) in (6) gives:

$$r_1 \approx r_0^*da^*f/\ a^2\ ; \qquad (7)$$

For the same subject distance (a) and depth of subject (da) it is obtained that the defocusing is decreasing, when the aperture ($r_0$) and the focal distance (f) are decreasing. When f decreases, then the image also decreases, however. The relative unsharpness is:

$$r_1/\ h \approx r_0 \ast da/\ (H^*a); \qquad (8)$$

$$r_1/\ h \approx f^* \ da/\ (H^*a^*2Q); \qquad (9)$$

where the aperture $Q=f/2\ r_0$;

Thus the reduction of the focal aperture is an important possibility for increase of the depth of field. The aperture cannot however be reduced too much, i. e. the light level arriving at the sensor must be large enough. The density of light for the image, I(h), at the sensor is proportional to the density of light from the subject, I(H) according to:

$$I(h) \sim I(H)^*H^{2*}r_0^2\ /\ (h^*a)^2\ ; \qquad (10)$$

With (10) in (9) it is obtained:

$$r_1/\ h \sim \{I(h)/\ I(H)\}^{0.5} \ast da^*f\ /\ (H^*a); \qquad (11)$$

i. e. if I(h) cannot be further reduced and the light conditions and level are selected, then a reduction of the focal distance presents a possibility to improve the relative focusing.

Corrections at integration of the new basic image from the different image photos.

Photos, shot with the same relative position of the lens optical center relative of the scene subject, are simple to transform by perspective turnings and sizing, knowing the settings for the lens and sensor of respective photo. By a traditional camera, focal distance settings are the only focal plane setting available. That means that the photo series obtains parallel image planes, and no cutting focal planes for the same scene view. Together with the other applicable methods, described above, also those cameras can be used for advanced product photography, where depth of field and perspective otherwise gives problems.

At multi-photo integration, small deficiencies might arise in practice. Tolerances in settings and mechanical disturbances and imperfections might cause changes between subsequent image shots. Photography with long exposure time might require extra stable basis for camera and subjects, preventing disturbances from blurring the image. Until further actions, it is presently assumed that each useful image has good focus within its limited depth of field. Still corrections might be needed, after that the images principally have been transformed to the basic image format. Although each image mainly is in the right position, right perspective and right size. The following methods can be used for subsequent corrections:

a. Consecutive images with different focus can be corrected, when a sharp element in one image corresponds to an unfocused one in neighboring images. The position of the unfocused element can be determined, and by comparisons of detail positions in other images, positions, size of scale etc. can be coherently corrected. Common information for images is used. Calculation processes are faster, when a few well-defined elements are selected for the comparison process and the elements preferably spread out over the image area. For the right image size the matching might be reduced to match the positions of the image elements. For errors in the scale size, the errors of scale might be obtained by "measurements" (calculations) of the distances between element positions. At perspective turning the scale of size might be different in different parts of the image, e. g. different in the x- and y directions.

b. Common sharp image elements are obtained from cutting focal planes, e. g. for the example of the cereal box in point 2.1. By overlapping of common borders and edges the different images can be corrected and integrated.

c. Added images can be shot, positioned at cutting focal planes e. g. to obtain sharp image elements in a tilted plane, which then can be recognized as sharp elements in different images. Then common references are obtained for and through several images.

d. Images being shot with significantly reduced aperture obtain larger depth of field and can be references in corrections of other images, especially for elements with high light and contrast strength.

e. Photos being shot with reduced focal distance can also give larger depth of field in spite of subsequent magnifications.

Other examples of the method.

The sharpness of a product image can also be improved by increasing the resolution of the image in added photos, e. g. a product might be photographed with only parts of it filling the image (sensor) area. Then the sensor resolution is better utilized for this part of the total product image. The other parts of the product can be photographed with the same or different magnifications. Then the different images can be transformed to a basic image, where the whole desired image is included, and then with a high resolution. The resolution in the subsequent processing of the image is not limited by the condition that the whole image must be positioned on the sensor. The computer capacity can be used, creating a computer image with much higher resolution than the sensor. The method to integrate the different photos is easier, when as earlier the position of the lens optical center is mainly maintained relative the image subject. E g that can be performed by photographing, turning the camera around the lens optical center. In the same way as earlier the integration is simplified when the different images are overlapped, where well defined elements are contained, and the overlap can also be used in comparisons between images for e g corrections. One or more images can also be shot with a lens with less focal distance, where essential parts of the whole image are contained, and contribute with general information about the basic image.

The method of selecting parts of the subject and photographing those with larger focal distances, possibly with the help of zoom, can be used together with the other methods, which are used for increased depth of field. The method might be applied for imaging very small details in a product, or for details used in the integration of image areas giving better resolution and by that a more accurate match.

Examples on means for performing the improved depth of field.

In one preferred embodiment, the means consists of units in the camera and units in computation equipment, e. g. a computer of PC type. The camera units consist of controls, which settings can be registered. The settings are for the lens and/or the sensor. For traditional cameras with electronic sensor, the distance focusing is made by the lens. T/S cameras might have controls for both the lens and the sensor, and those have generally large variability, i. e. they can also do tilting and give focusing and perspectives in many various planes. The settings can be controlled and read, and the lens and sensor might also, according to the invention, be related to the geometry of the camera design. The values on the optical system as focal distance, optical center or corresponding lens descriptions might be valuable in subsequent calculations after the photographing. It is simplifying when the position of the optical center is known, especially at lens changes between photos.

In the calculation unit, the computer, there is software, which can store several images and work with transformations and transfer of images by size of scale, perspective turning and positioning. If the optics and camera setting data are not included together with the image data transfer, the operator or photographer might read and feed in the values of the settings, or the computer makes the evaluation.

The choice of photo set up is made by the photographer, and he can set the camera manually or with help of the computer system. He can e. g. read the position for the point he will focus and read the connected focus setting. By reading three points a focus plane is defined, and a computer can help calculating the settings of lens or sensor to establish the desired focal plane. The computer can also contain an additional program for automating all or various parts of the work. The control can also include selection of aperture from light measurements and other control of camera functions.

There are also included programs, which select image areas from respective transferred image, possibly with interactions from an operator.

Programs can be added that, possibly in interaction with an operator, select elements from different images, which are the basis for calculations of subsequent corrections of the images, including matching the basic image format for integration of focused image elements to the new focused basic image.

What is claimed is:

1. A method to increase the depth of focus, giving improved sharpness of subjects with such extensions that sharpness regularly cannot be obtained over the whole picture, using at least two images obtained with different camera settings, which include at least one of change of focus and change of aperture, in mainly keeping the same position of the lens optical center relative to the subject, and combining information from those images to obtain one new image, the method comprising the following steps:

a. taking photos of subjects with different focus settings between images, creating different focus for different image areas, including natural variations and disturbances of the photo sequence, generating changes in the images exceeding the said change of focus, the changes in images composing changes including any of position, scale and perspective;

b. matching the different photo-images to the position, scale and perspective of a selected basic image comprising the sub-steps of b1. selecting a basic image;

b2. identifying and localizing border lines and highly contrasting structures in a number of images;

b3. calculating the geometrical transfer of a number of images to the basic image, using at least one of position shifts, change of scale and perspective tilting;

b4. choosing common references for evaluating and/or correcting the matching of the images using the positions of identified common structures; c. building a new image from the matched images by sub-steps including c1. analyzing image areas with continuous change of focus of image elements in the area, corresponding to a continuous change of distance, where focus changes are utilized for borderlines and/or highly contrasting structures in distance, and identifying transfer positions, where change of focus is of corresponding size seen from the respective image focused state, and selection of a transfer border between image information from one image and next neighboring focused image, considering the said transfer positions, and when large discontinuities in the image transfer are present, a fine tuned match is performed of the two images along the common transfer border, including any method step from (b);

c2. selecting border lines for analyzing a number of border line areas, regarding differences in focus between the two sides of the border line for the respective focused image, for identifying transfer borders with focus distance gaps larger than a given value;

correcting the border line area, where the border line is a transfer border according to (c2), between different focused images, with reduction of defocused image information from the defocused image side to the focused image side, and when the said focus gap is less than the said given value, the transfer is considered as the transfer according to (c1);

c3. utilizing, for the analysis of focus in (c1) and (c2) fast variations of light and/or color as functions of area based space coordinates, comparisons for best focused state between images, using borderlines and/or highly contrasting structures of subjects, d. merging the identified focused image regions, according to (a)–(c), into the said one new image.

2. A method according to claim 1, further comprising: analyzing the speed of variation in light or color, selectively using derivatives of, relative derivatives of, differences of, and combinations or quotients thereof and of the strength of light or colors.

3. A method according to claim 1, comprising: adding information by use of photo including at least one of (a) and (b) below, a. adding photo with extra small focal aperture, increasing the depth of field and used for corrections of other images or matching of other images, b. adding photo with a cutting focal plane, tilted related to another focal plane, obtaining sharp image elements in the tilted plane, which can be recognized in other images and used for corrections of other images or matching of other images.

4. A method according to claim 1, comprising: identifying borders, which constitute contours between objects belonging to different focused image distances, where a first object is an image of a first subject, which is closer to the lens than a second subject, which is reproduced as a second object, and where the first object is focused in a first image at a first focused image distance with a border to the defocused second object, and where the first object is presented in a second image at a second focused image distance of the second object, where the first object is defocused and its blurred image is spread over the said border and disturbing the focused image of the focused second object at an area along the border, and using at least one of the steps (a) to (d) below;

a. reducing the said disturbance in the second image by calculating the disturbance from the image information of the focused first object in the first image, and then subtracting that disturbance from the second image, b. in the second image, the second object has got its focused state determined by optical rules, and in the said disturbed area along the border the second object has a successively reduced intensity towards the said border, which intensity is corrected, and the said border in the first image is the border, when integrating the second object from the second image in the process to create the final image, c. building a final basic image starting with the said first object in the said first image, the image area is increased while comparing images for neighboring distances, i e comparing the first image with the second image, and when passing the disturbed area along the border in the second image, the second image contains a less disturbed focused image of the second object and the said final image area is growing by integration, using element areas from the less disturbed second object in the second image, d. structures of the focused, undisturbed, part of the second object in the second image are extrapolated into the said disturbed area along the border to achieve focusing in this same area along the border, where the second object is defocused in the first image.

5. A method according to claim 1, farther comprising:

building the new basic image successively in the steps of
  starting at a selected focused image element of a selected image;
  increasing the examined area continuously, while comparing with neighboring images;
  making transition of images, when element grows sharper at another image;
  increasing the new basic image area with the area from the present image;
  selectively starting on the front image and successively working towards the background.

6. A method according to claim 1, further comprising:

including to the computer means a man machine interface, MMI, for interactions with an operator;

reducing the complexity of the image processing by an operator selectively performing steps of
  defining on the computer screen, which parts from which image to be transferred to the new basic image, reducing the processing to mainly image matching and final corrections of the parts in position and border defocusing;

selecting details from different images for the image matching;

selectively defining strategies for different areas for the new image building.

7. A method according to claim 1, comprising: determining the defocused width of borders, edges etc. and subsequently correcting the sharpness also for other image elements, selectively by also estimating the image positions of the sharp focused elements.

8. A method according to claim 1, comprising: using consecutive images, calculating the image plane distance of an image element and its real focused extension at that plane, using that for image elements that are defocused in images at both side of the theoretically sharp image plane.

9. A method according to claim 1, comprising: inter- or extrapolating geometrical structures, lines, rectangles, circles etc. from neighboring images to achieve focusing in defocused spaces in between, and selectively expanding the method to include storing of geometrical structures in a library for comparisons with obtained image elements, e. g. by use of correlation, and when good agreements, the geometrical structures are used for corrections, the geometric structures possibly also including signs, letters or symbols.

10. A method according to claim 1, comprising: correcting at least one of position, scale, perspective for different images, performing position comparisons between corresponding image elements in at least two images, and selectively using successive comparisons between different images, achieving several images related to each other.

11. A method according to claim 1, utilizing the sensor resolution better, by photographing parts of a product with larger focal distance, the product part covering a larger part of the sensor area, comprising: photographing other parts of the product with the same or different magnification, where also image distances related to the focal distance might vary, and that different images are transferred to a basic image, where the whole image is covered and then with a corresponding higher resolution, where the capacity of the computer is utilized, which can give much higher resolution than that of the sensor, covering the whole final image, and selectively integrating different images, shot while keeping the position of the lens optical center relative to the subject, e. g. performing that, by turning the camera with the optical lens center as the turning point, and simplifying the image matching by overlapping images, where well defined elements are included and used at comparisons between images for possible corrections, and photographing one or more images with reduced focal distances, where essential parts of the total image are included in the same photo.

12. Means for performing the tasks according to claim 1, comprising: control settings for the camera, calculation unit for storing of image data and software program for processing of several images and for calculation of transfer of images through at least one of; scale of size, perspective and position, and for selecting image elements to be used from respective image and integrating those element to a basic image.

13. Means according to claim 12, aiding the photographer or operator with controls of the: means for defining positions of points in the image, means for focusing those points and register the focus in the calculation unit, means in the calculation unit for calculating subsequent corresponding values for lens and/or sensor settings, means for control of the settings for photographing, and selectively adding means for storing basic data for respective control in the calculation unit, being e. g. a pocket calculator or a PC, for use at calculations and calibrations of values for control of the control means.

14. Means according to claim 13, comprising: means for the photographer to mark points on a computer screen image, and computer programs calculating and controlling the camera settings automatically by electronic controls.

15. Means according to claim 12, comprising: control settings for at least one of the lens and sensor, relating to respective position in the camera, and calculation unit with algorithms, controlling settings of respective image photo and transforming images to a selected basic image, and possibly a program unit interacting with an operator for at least one of; camera settings for the said image photos, image element selection from respective said image and integration of image elements to a basic image.

16. A method according to claim 1, where photography film are used instead of electronic sensors, comprising; photographing in the corresponding way, and subsequently scanning the film photos to obtain electronically stored images, which are subsequently processed in the corresponding way.

17. A method according to claim 1, comprising: adding photo with reduced focal distance, selectively by zoom or change of lens, where image transformations are simplified by keeping the position of the lens optical centers relative the subject, giving a smaller image, not fully utilizing the sensor resolution, while depth of field has a potential to be increased, although by remagnification of the image also the defocused areas are magnified, the defocused elements obtaining improved focus and the image being used for adding information and to help matching other images.

18. A method according to claim 1, comprising: first taking photos of the same image, but with focus on different elements of the image with the help of zoomtechnique and then using a method of said claims for giving the said same image an increased depth of field.

* * * * *